(12) United States Patent
Hamami

(10) Patent No.: US 6,222,820 B1
(45) Date of Patent: Apr. 24, 2001

(54) METHOD OF VCC/VPC REDUNDANCY FOR ASYNCHRONOUS TRANSFER MODE NETWORKS

(75) Inventor: Ilan Hamami, Tel Aviv (IL)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/086,040

(22) Filed: May 28, 1998

(51) Int. Cl.[7] .................................................. H04J 1/16
(52) U.S. Cl. ............................................ 370/218; 370/228
(58) Field of Search .................................... 370/216, 217, 370/218, 219, 220, 225–28, 230, 237, 351, 397, 399

(56) References Cited

U.S. PATENT DOCUMENTS

| 4,345,116 | * | 8/1982 | Ash et al. ............................. 179/18 |
| 5,483,536 | | 1/1996 | Gunji et al. ......................... 370/85.14 |
| 5,550,818 | | 8/1996 | Brackett et al. ....................... 370/60 |
| 5,566,014 | | 10/1996 | Glance ................................. 359/124 |
| 5,818,842 | * | 10/1998 | Burwell et al. ....................... 370/397 |

OTHER PUBLICATIONS

Spiegel et al., An Alternate Path Routing Scheme Supporting QoS and Fast Connection Setup in ATM Networks, 1224–30, 1994.*
Perlman, R., "Interconnections: Bridges and Routers", Addison–Wesley Publishing, Section 9.2.4, Chapter 9, pp. 205–264 (1992).
Sedgewick, R., "Algorithms", Second Edition, Addison–Wesley Publishing, Chapter 17, pp. 245–247 (1988).
Doeringer, W. et al., "Routing on Longest–Matching Prefixes", *IEEE/ACM Transactions on Networking*, vol. 4, No. 1, Feb. 1996, pp. 86–97.
Williams, K. A., "A Distributed ATM Network Based on an Optical Passive Star", printed from website http://williams.cs.ncat.edu/ATMStar.htm, 2 pages, (1998).
"All–optical ATM–Switch based on Self Electro–optic Effect Devices (SEED's)", printed from website http://www.stw.nl/projecten/T/tel3997.html, 2 pages, Feb. 2, 1997.

* cited by examiner

Primary Examiner—David R. Vincent
(74) Attorney, Agent, or Firm—Howard Zaretsky; David J. Weitz; Wilson Sonsini Goodrich & Rosati

(57) ABSTRACT

A method of selectively providing redundancy on a dynamic basis to end users that request it. The method establishes both a primary and a redundant connection for each connection requested to be redundant. The redundancy method of the present invention has application to PNNI networks and to any public network that uses signaling and routing in its operation, i.e., ISDN, frame relay, networks utilizing general signaling, voice networks, etc. A unique call reference number generated by the end user is carried unchanged from switch to switch along the path. Each switch along the routing path registers the call as a primary call in its database. Subsequently, once the primary connection is established successfully, the redundant connection is established. Each switch along the redundant path checks to see if the primary path already includes that switch. If it does, then either the call can be rejected or it can be permitted with the condition that a link be used to the next hop that is not in use on the primary path. Once established, the originator of the redundant path continuously monitors the primary connection for failures. If a failure is detected, data traffic is switched from the primary connection to the redundant connection with any loss of cells being handled by the upper communication protocol layers.

12 Claims, 8 Drawing Sheets

METHOD OF VCC/VPC REDUNDANCY FOR ASYNCHRONOUS TRANSFER MODE NETWORKS

FIELD OF THE INVENTION

The present invention relates generally to data communication networks and more particularly relates to a method of providing redundancy or VCC/VPC virtual connections in an Asynchronous Transfer Mode (ATM) network.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications", Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Prior Art Redundancy Schemes

Many of today's high end applications require a high degree of fault recovery capability from the communications networks which carry their data from one point to another. Traditionally, fault recovery was achieved by placing extra physical resources in the network to insure a backup path from any point to any point across the network. Examples include backup links, backup network elements such as switches, routers, bridges, etc.

The recovery capability requirement also includes quick recovery response times. For example, an FDDI physical layer includes a backup ring which is used immediately, on the order of milliseconds, when a physical connection problem is detected by a loss of signal on the primary ring.

In ATM networks, the architecture of the network is based on point to point links which function to carry many point to point and point to multipoint virtual circuits or connections (VCs). Since the routing of these numerous virtual connections is dynamic, there is no way to determine a priori a redundancy connection which will actually be redundant, i.e., a connection that does not use any part of the original path for the redundant path.

In addition, there is no implicit mechanism provided for in the ATM standards. Prior art attempts to recover from faults in ATM networks take a relatively long time to execute, e.g., tens of seconds, which may be long enough to cause any connected applications to crash. Also, the prior art techniques require network users to re-setup their connections that were broken as a result of the failure. The switchover time was also dependent on a variety of different timeouts associated with the user application, rather than a deterministic means that provides fast detection and switchover times.

There are some technologies that can potentially provide redundancy, such as Ethernet, Token Ring, FDDI, etc. A characteristic feature, however, of all these protocols is that it is very complex and costly to implement redundancy in any shared media such as these. In particular, the FDDI standard is the only shared media standard that defines a redundant recovery path. The standard, however, defines the redundant recovery path for all entities and all connections connected to the media without making it selective. Thus, it is all or nothing without leaving the choice up to only the entities that desire a redundant connection.

SUMMARY OF THE INVENTION

The present invention is a method of selectively providing redundancy on a dynamic basis to those end users that desire it. The method provides a redundancy feature that can be used on a call by call basis by end users at the time a call setup is requested to be established. The method functions to establish both a primary and a redundant connection for each connection requested to be redundant.

The method has the advantages of being quick with fast fault detection and subsequent fast switchover of traffic to the redundant path. Note that although some data may be lost until the switchover to the redundant connection is complete, this should not pose a major problem as the upper layers in the protocol stack at the end station, i.e., the Transport Layer, are able to compensate for the data loss. In most applications there is a higher priority on having a redundant link with the consequent potential loss of some data. In these applications, there is likely upper protocol layers in the communication stack that can handle the necessary retransmission, re-ordering, etc. required.

The redundancy method of the present invention has application to PNNI networks, B-ICI networks and to any public network that uses signaling and routing in its operation, i.e., ISDN, frame relay, networks utilizing general signaling, voice networks, etc.

The method functions to establish a primary connection from the source end user to the destination end user. A unique call reference number is generated by the end user and is carried unchanged from switch to switch along the path. In response to indicators that the call is a primary portion of a redundant call, each switch registers the call as a primary call in its database.

Subsequently, once the primary connection is established successfully, the redundant connection is established. Each switch along the redundant path checks to see if the primary path already includes the switch itself. If it does, then either the call can be rejected or it can be permitted with the condition that a link be used to the next hop that is not in use on the primary path.

Once established, the originator and the destination of the redundant path continuously monitor the primary connection for failures. If a failure is detected, data traffic is switched from the primary connection to the redundant connection with the loss of cells being handled by the upper communication protocol layers.

If the redundant connection cannot be established, then depending on options set by the user or network management entity, the primary call can be permitted without the redundant path or the entire call can be rejected.

There is thus provided in accordance with the present invention a method of providing virtual circuit connection/ virtual path connection (VCC/VPC) redundancy on a selective basis in a network from a source end user to a destination end user, the method comprising the steps of establishing a primary virtual circuit (VC) connection from the source end user to the destination end user via a first route, establishing a redundant virtual circuit (VC) connection from the source end user to the destination end user via a second route, wherein the second route is redundant to the first route, monitoring the primary virtual circuit for a failure on a continual basis and switching data traffic from the primary virtual circuit to the redundant virtual circuit in response to the detection of a failure on the primary virtual circuit.

The network elements making up the first route are not part of the redundant route. Alternatively, the network elements making up the first route are mostly not part of the second route, and wherein the second route may include one or more overlapping network elements whereby any links into and out of the overlapping network element on the first route are not used on the second route.

The method further comprises the step of rejecting the establishment of the primary virtual circuit and the redundant virtual circuit if the second route includes one or more overlapping network elements. Also, the method further comprises the step of permitting the establishment of the primary virtual circuit in the event that the redundant virtual circuit could not be established.

The step of monitoring comprises the step of utilizing Operations, Administration and Maintenance (OAM) F5 end to end cells to detect the failure of the primary virtual circuit.

A first virtual circuit is established between the source end user and a first network edge switch and a second virtual circuit is established between the destination end user and a second network edge switch. The primary virtual circuit and the redundant virtual circuit are established between a first network edge switch and a second network edge switch, the source end user and the destination end user connected to the first and second edge switch, respectively, via a single virtual circuit.

The step of establishing a primary virtual circuit connection comprises the step of sending a setup message request containing a calling party number with a field indicating a primary route is to be established, standard call reference number and a redundant call reference number.

The step of establishing a redundant virtual circuit connection comprises the step of sending a setup message request containing a calling party number with a field indicating a redundant route is to be established, standard call reference number and a redundant call reference number. The network may comprise an Asynchronous transfer Mode (ATM) network. In addition, the step of monitoring comprises both the originator and the destination of the call monitoring the primary virtual circuit for a failure on a continual basis.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| ANSI | American National Standards Institute |
| ATM | Asynchronous Transfer Mode |
| B-ICI | Broadband Inter-Carrier Interface |
| CCITT | Comite Consulatif International Telegraphique et Telephonique |
| FDDI | Fiber Distributed Data Interface |
| IE | Information Element |
| IP | Internet Protocol |
| ISDN | Integrated Services Digital Network |
| ITU | International Telecommunications Union |
| NE | Network Element |
| NI | Network Initiated |
| NMS | Network Management System |

-continued

| Term | Definition |
| --- | --- |
| OAM | Operations, Administration and Maintenance |
| PNNI | Private Network to Network Interface |
| QoS | Quality of Service |
| UI | User Initiated |
| UNI | User to Network Interface |
| VC | Virtual Circuit |
| VCC | Virtual Channel Connection |
| VCI | Virtual Circuit Identifier |
| VPC | Virtual Path Connection |
| VPI | Virtual Path Identifier |

General Description

The present invention is a method of providing dynamic VCC/VPC redundancy for an ATM network. The method has application to PNNI networks, B-ICI networks and any public network that uses signaling and routing in its operation, i.e., ISDN, frame relay, networks utilizing general signaling, voice networks, etc. The redundancy method of the present invention provides selective redundancy meaning that the redundancy feature can be exercised on a call by call basis. The request for call redundancy is typically made by the higher layer application software. Thus, the local switch is not burdened with having to provide redundancy to every call placed on the switch.

Figure 1:
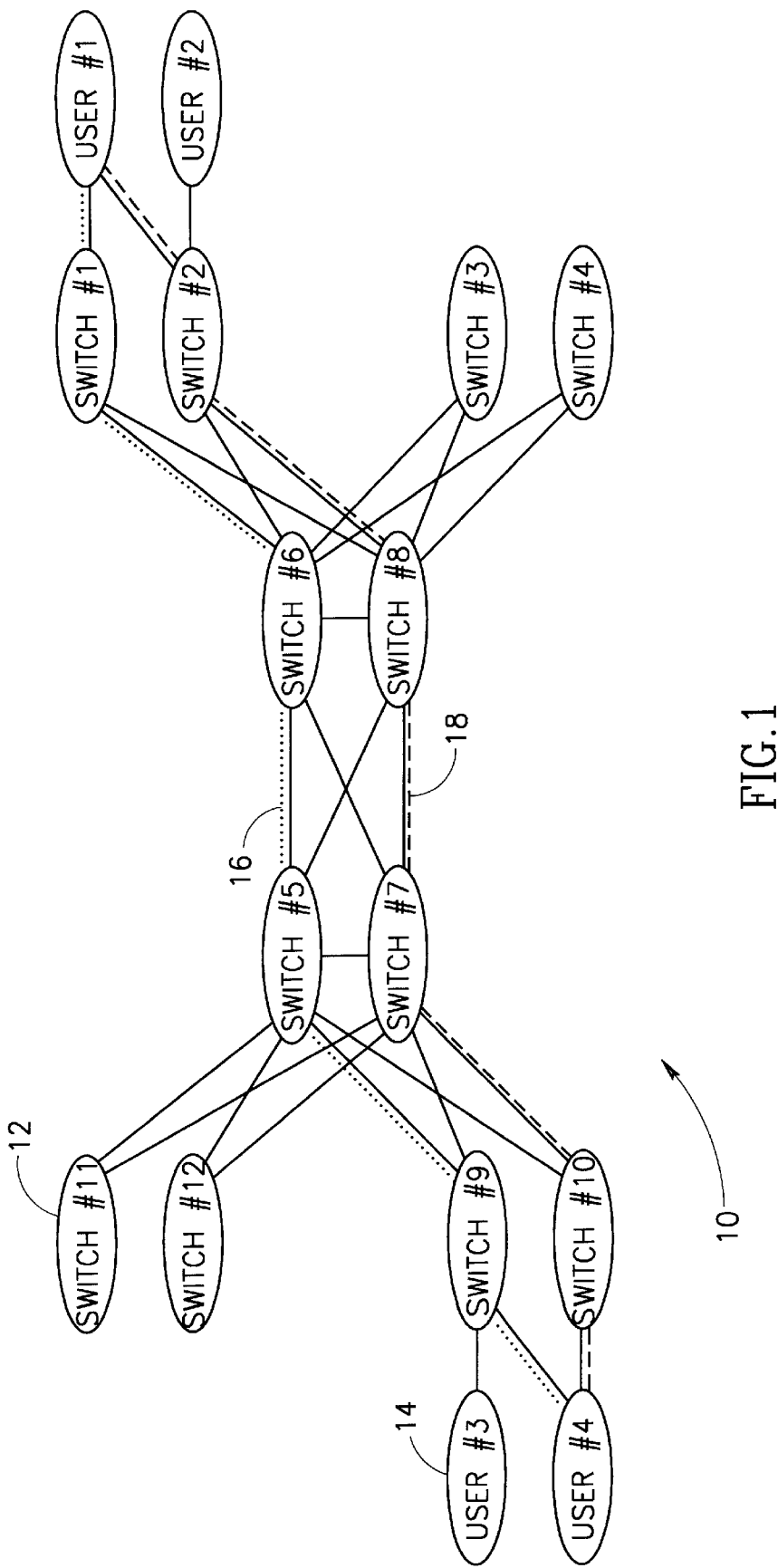
FIG. 1 is a diagram illustrating an example network topology wherein primary and a redundant connections have been established from a source user in accordance with the method of the present invention.

A diagram illustrating an example network topology wherein primary and redundant connections have been established from a source user in accordance with the method of the present invention is shown in FIG. 1. The network, generally referenced 10, comprises a plurality of switches 12 labeled switch #1 through switch #12 and a plurality of end users 14 labeled end user #1 through end user #4.

A redundant connection can be established in one of two modes: a user initiated (UI) mode and a network initiated (NI) mode. In the user initiated mode, the end user is responsible for establishing both the primary and redundancy connections, assuming that the end user desires to establish a redundant connection for a particular call. Both the primary and the redundancy paths include the connection between the user and the network edge device, this being the main feature of the user initiated mode.

FIG. 1 illustrates connections established using the user initiated approach. The primary connection is established between source end user #1 and destination end user #4.

The primary connection is represented by the dotted line 16 and the redundant connection represented by the dashed line 18. The user initiated mode requires that the source end user have at least two links with each link connecting to a different switch.

Alternatively, a network initiated connection can be established whereby under control of a network management entity such as a network management system (NMS), a network edge switch establishes the redundant connection for the end user. In the network initiated mode, the redundant path does not include the link between the end user and the network edge switch.

Figure 2:
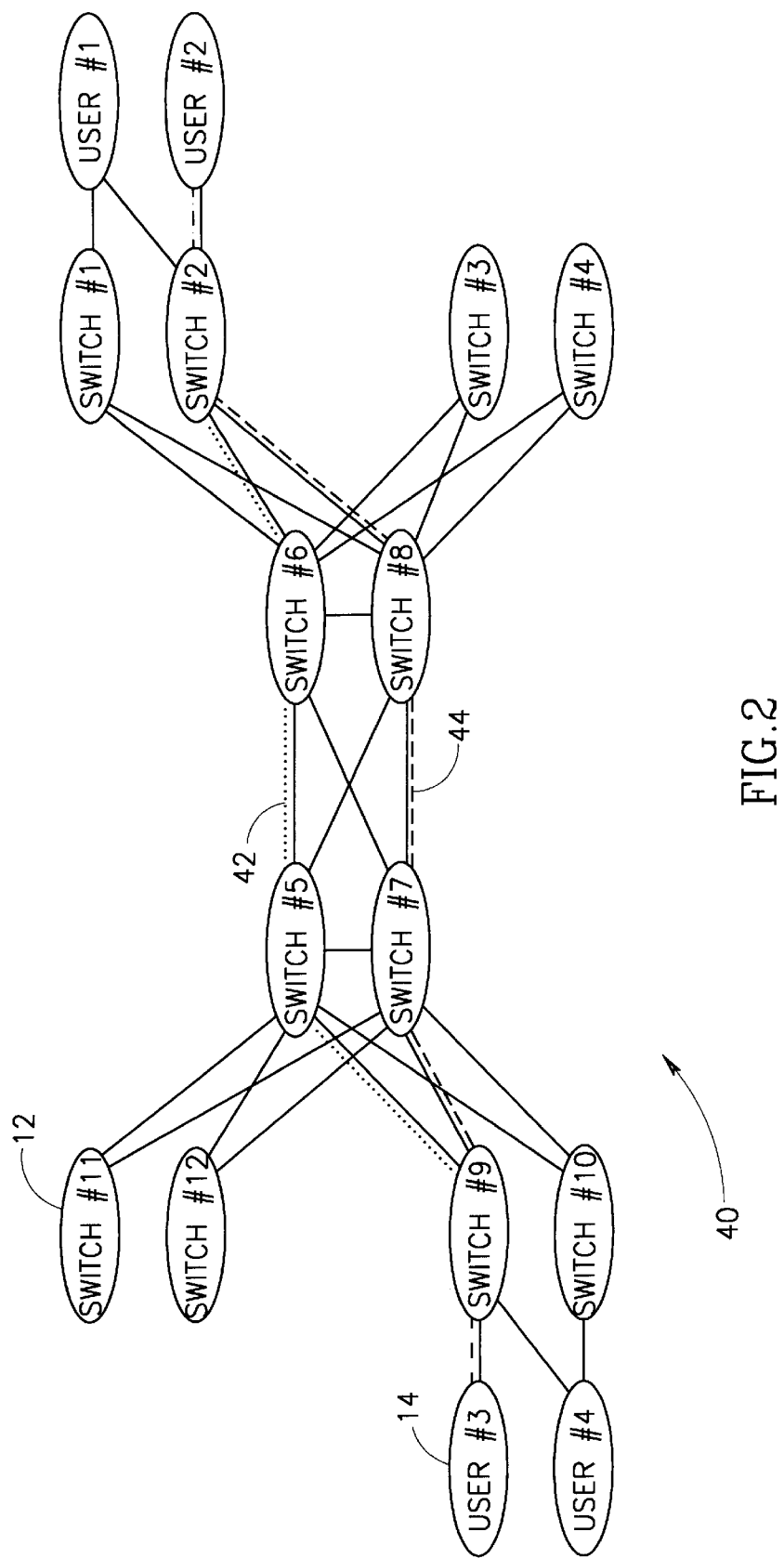
FIG. 2 is a diagram illustrating an example network topology wherein primary and a redundant connections have been established from a source node in accordance with the method of the present invention.

A diagram illustrating an example network topology wherein primary and redundant connections have been established from a source node in accordance with the method of the present invention is shown in FIG. 2. The network, generally referenced 40, comprises a plurality of switches 12 and end users 14. A single connection is established between source end user #2 and switch #2 and also between destination end user #3 and switch #9. A primary connection, represented by dotted line 42, is established between switch #2 and switch #9. Similarly, the redundant connection, represented by dashed line 44, is established between switch #2 and switch #9.

In the network initiated mode, the NMS or other management entity instructs the edge switch device, i.e., switch #2, to establish the redundant connection. The user, i.e., user #2, still triggers the call connection but the edge switch performs the actual call establishment.

It is important to note that an end user may have a choice of utilizing the user initiated or network mode of redundant call establishment. If the end user has only a single link to one switch, than it can establish a redundant path using only the network initiated mode as it only has one link to switch.

If, however, the end user has two or more links to two or more switches, than the end user has an option of using either the user initiated or network modes of redundant call establishment.

Thus, the originating network element (NE) of the redundant VCC/VPC connection can be either the end user or an edge switch, and is referred to as the redundant VCC originator.

In order to prevent the overlap of the redundant connection onto the previously established primary connection, each node along the path must be able to associate the primary and redundant call setup attempts using the signaling protocol. This is accomplished be using signaling that includes setup messages that uniquely define the two different calls, i.e., primary and redundant.

Figure 3:
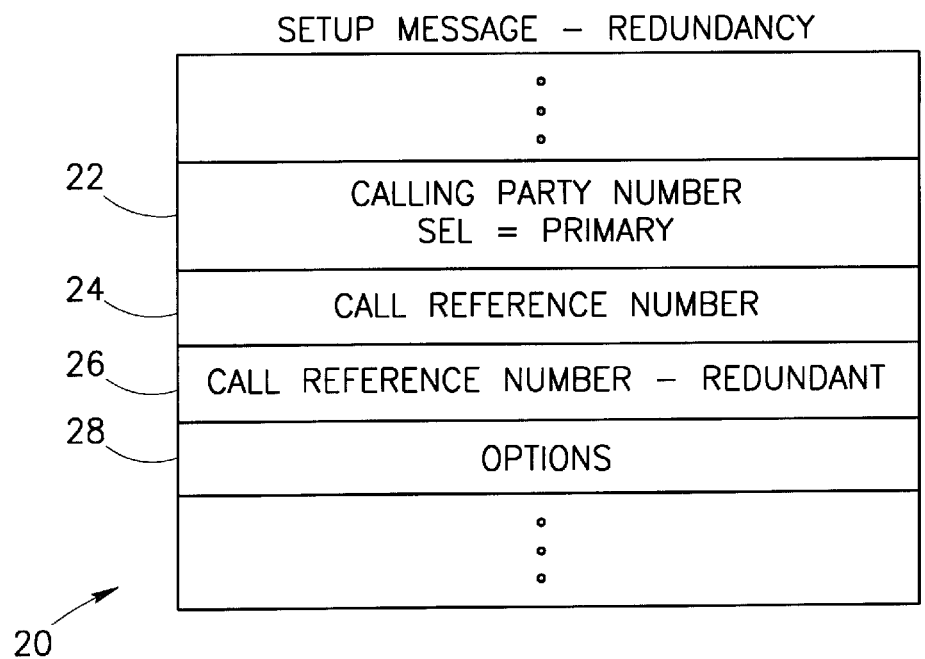
FIG. 3 is a diagram illustrating the setup message of the present invention utilized to establish the primary connection.

A diagram illustrating the setup message of the present invention utilized to establish the primary connection is shown in FIG. 3. The setup message 20, known as SETUP_REDUND, comprises a plurality of information elements (IEs) normally used in the standard UNI signaling, such as message type, message length, ATM user cell rate, called party number, connection identifier, QoS parameter, endpoint reference, etc. Also included are three IEs that are used by the switches along the path to associate the primary and redundant connections. They include the calling party number 22 with the SEL byte set to PRIMARY, the call reference number (CALL_REF) 24 and a redundant call reference number (CALL_REF_REDUND) 26. In addition, the setup message includes an information element OPTIONS 28 indicating the options selected for that particular call. The options, described in more detail hereinbelow, include Redundant Switch, Redundant Link and Primary Path Only. Note that including the options in the setup message is optional. Alternatively, the switches in the network can be configured with the options via the NMS or other management entity.

Figure 4:
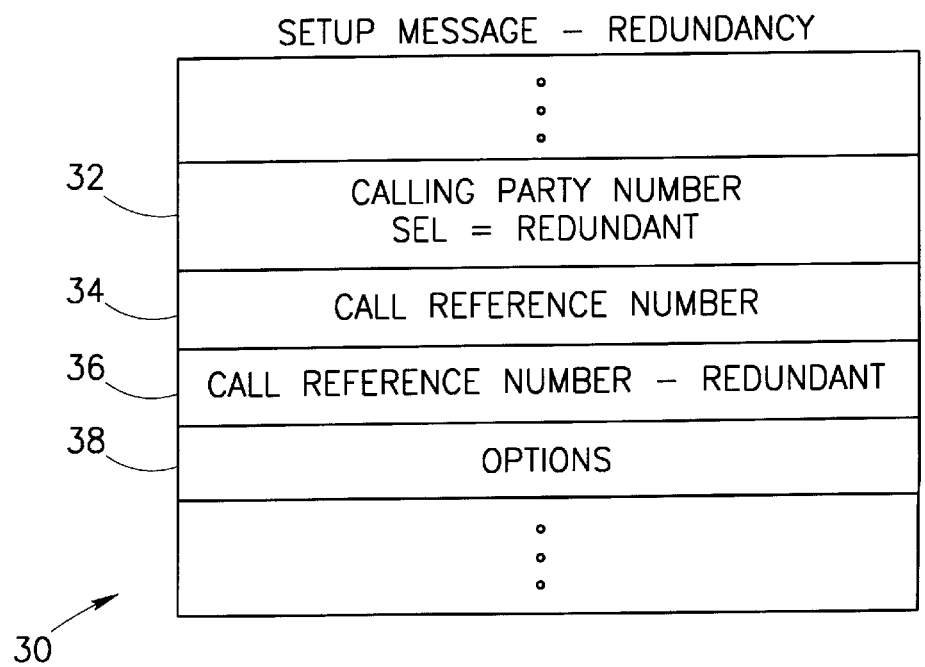
FIG. 4 is a diagram illustrating the setup message of the present invention utilized to establish the redundant connection.

A diagram illustrating the setup message of the present invention utilized to establish the redundant connection is shown in FIG. 4. The setup message 30 comprises a plurality of information elements (IEs) normally used in the standard UNI signaling, such as message type, message length, ATM user cell rate, called party number, connection identifier, QoS parameter, endpoint reference, etc. Also included are three IEs that are used by the switches along the path to associate the primary and redundant connections. They include the calling party number 32 with the SEL byte set to REDUNDANT, the call reference number (CALL_REF) 34 and redundant call reference number (CALL_REF_REDUND) 36. In addition, the setup message includes an information element OPTIONS 38 indicating the options selected for that particular call. The options, described in more detail hereinbelow, include Redundant Switch, Redundant Link and Primary Path Only. Note that including the options in the setup message is optional. Alternatively, the switches in the network can be configured with the options via the NMS or other management entity.

The network element that establishes the redundant path, uses the setup message of FIG. 3 to establish the primary connection and uses the setup message of FIG. 4 to establish the redundant connection.

Initially, a primary path will be established for a call that was selected to be a redundant call. Via the signaling protocol, this primary connection will be recognized by each network element along the path by examining the calling party number (with SEL set to PRIMARY) and the redundant call reference number CALL_REF_REDUND. This information is used by the NEs along the path to prevent the routing of the redundant path to cross the primary path.

Similarly, a setup request for a redundant connection will also be recognized by the NEs along the path via the signaling protocol. The SEL value of REDUNDANT indicates to the NE that this setup message is for a redundant connection.

Note that in the case of both the primary and redundant connections, the indication thereof in the setup message can alternatively be made utilizing proprietary IEs rather than using a unique SEL value in the calling party number ATM address.

Note that the redundancy feature of the present invention can function operate only if all the NEs in the call paths implement the method of the present invention. If non supported network equipment, i.e., network devices that do not implement the method of the present invention, is connected to equipment that does, then the redundancy feature will be disabled if the route for the primary and redundant paths passes through one or more non supported network devices. The feature will also be disabled if no alternate connections are available between the calling end and the called end containing NEs that implement the method. The redundant feature of the invention requires that the redundant path between the calling end and the called end include NEs that implement the method of the present invention.

It is also important to note that the method utilizes standard signaling, e.g., standard ATM signaling for ATM networks, with the addition of the redundancy related information elements (described in connection with FIGS. 3 and 4) to establish the redundant VCC.

In accordance with the method of the present invention, either the end user or the network edge switch sets up a redundant connection for each primary connection immediately after the primary connection is established. Each network element along the setup path registers the VCC as a primary VCC in its database.

Each network element, e.g., ATM switch, that receives the call setup message requesting the NE to establish the redundant connection, first checks whether the primary connection was already established through that particular NE. If the primary route does not cross the redundant route, the NE can be part of the redundant path. If, however, the primary route path already crosses the NE, then either of two options are possible. The first option is termed the redundant switch option and the second option is termed the redundant link option. Each switch can either be preconfigured to take one of the two options, or the option can be specified in the call setup message as an OPTIONS IE described hereinabove in connection with FIGS. 3 and 4.

Under the redundant switch option, crossovers are not permitted between the primary and redundant paths. In other words, no switch, other then the end switches in the case of network initiated redundant call setup, can be on both the primary and the redundant call paths. If a switch is found to overlap paths, it replies, in response to the setup message associated with the redundant path, with a RELEASE or similar message, e.g., CRANKBACK message, thus rejecting the call. The RELEASE message comprises an IE indicating the cause as "Primary VCC already routed through here". The requesting entity will consequently try to establish the redundant path via a different link, if possible.

Under the redundant link option, the overlapping switch attempts to establish the redundant connection via a non overlapping link that does not carry the primary path and that leads in the direction of the destination.

Figure 5:
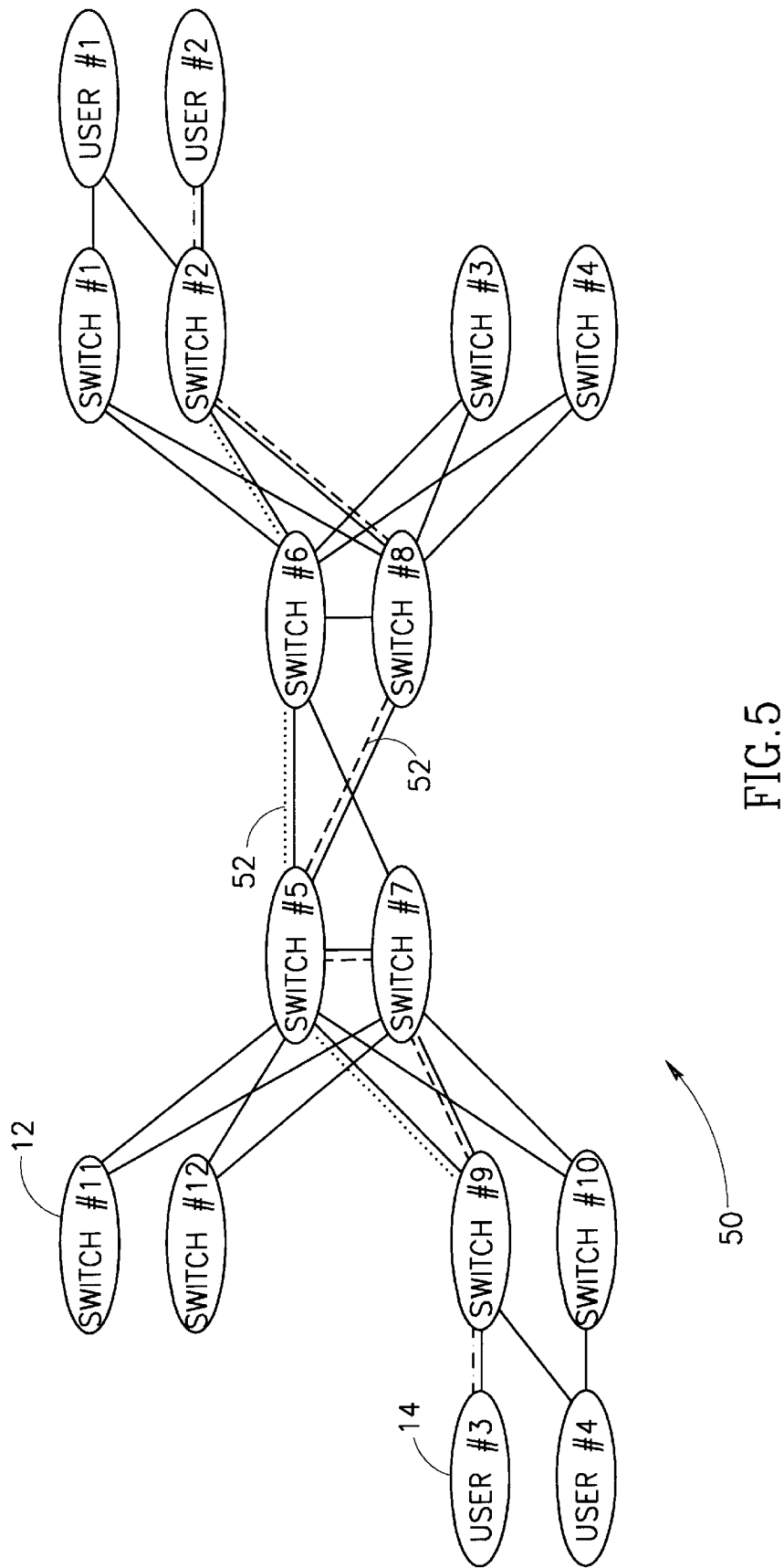
FIG. 5 is a diagram illustrating an example network topology wherein primary and a redundant connections have been established from a source node such that a node is common in both primary and redundant connections.

A diagram illustrating an example network topology wherein primary and a redundant connections have been established from a source node such that a node is common in both primary and redundant connections is shown in FIG. 5. The network, generally referenced 50, comprises a plurality of switches 12 and a plurality of end users 14. Source end user #2 sends a setup request message to switch #2 requesting a redundant connection to destination end user #3. The network initiated mode issued since user #2 has only a single link to switch #2.

Thus, switch #2 establishes the primary path, represented by dotted line 52, from switch #2 to switch #9 via switches #6 and #5. Once established, switch #2 establishes the redundant path, represented by dashed line 54, from switch #2 to switch #9 via switches #8, #5 and #7. Switch #5 is an overlapping switch being located on both the primary and redundant paths.

Assuming the setup message indicated that an NE use the second option (redundant link) in setting up the redundant path. Thus, switch #5 routes the redundant path to switch #7 via a link not used by the primary path. The call then proceeds through switch #9 to the destination end user #3.

In accordance with the method of the present invention, under the network initiated mode, the primary connection is not acknowledged to the end user until the redundant connection is successfully established. If the redundant connection cannot be established by the network edge switch, then either of two alternatives are possible. The first option is to acknowledge the primary VCC, via a CONNECT or other suitable message, even though the redundant VCC cannot be established. The second option is to reject the primary connection, via a RELEASE or other suitable message, with the cause indicating "no route to destination", due to the failure to establish the redundant connection.

Here too, the two alternatives can either be preconfigured in the network elements or can be indicated in the setup messages themselves via the OPTIONS information elements described in connection with FIGS. 3 and 4.

Figure 6A:
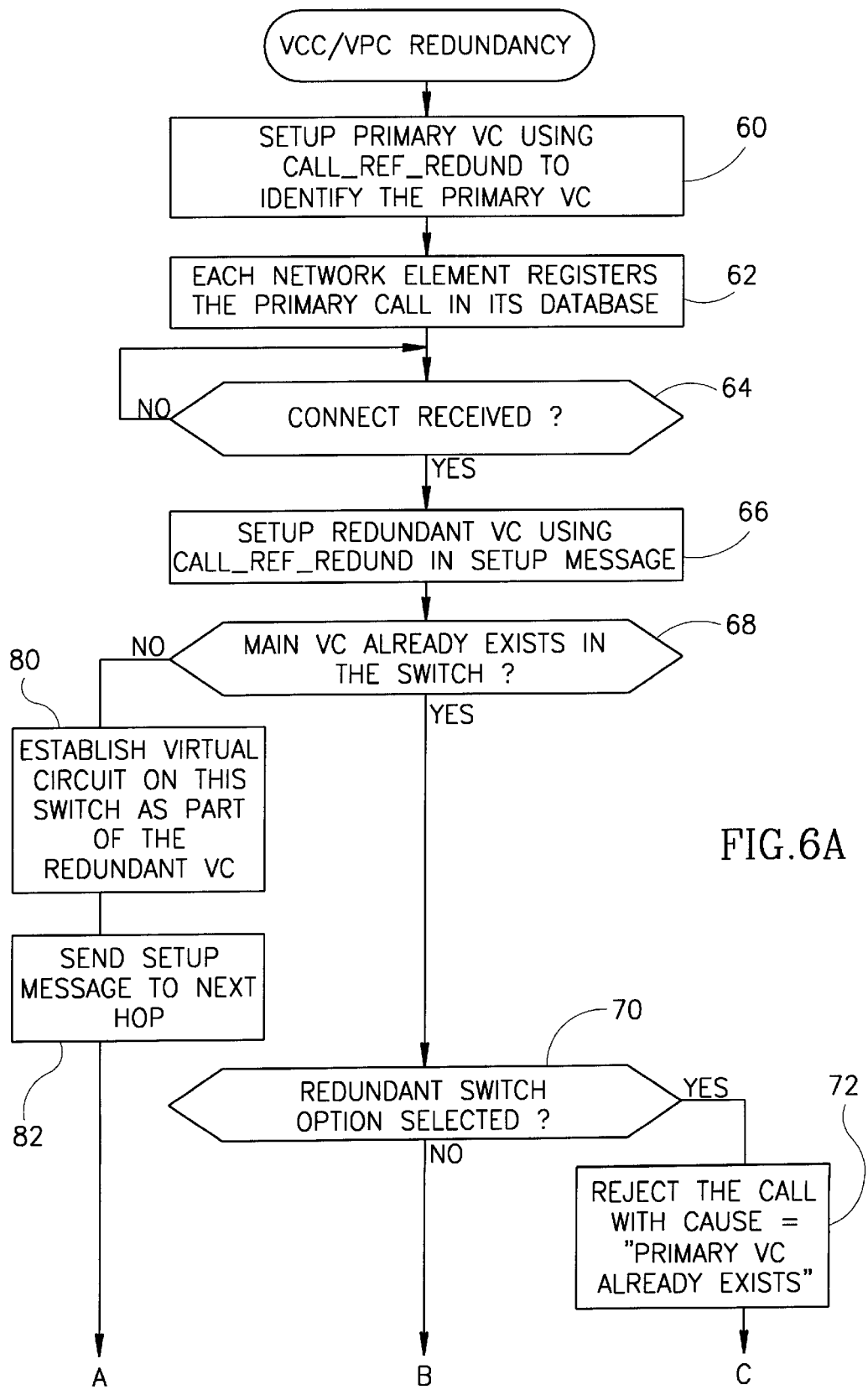
FIGS. 6A and 6B are a flow diagram illustrating the VCC/VPC redundancy method of the present invention.
Figure 6B:
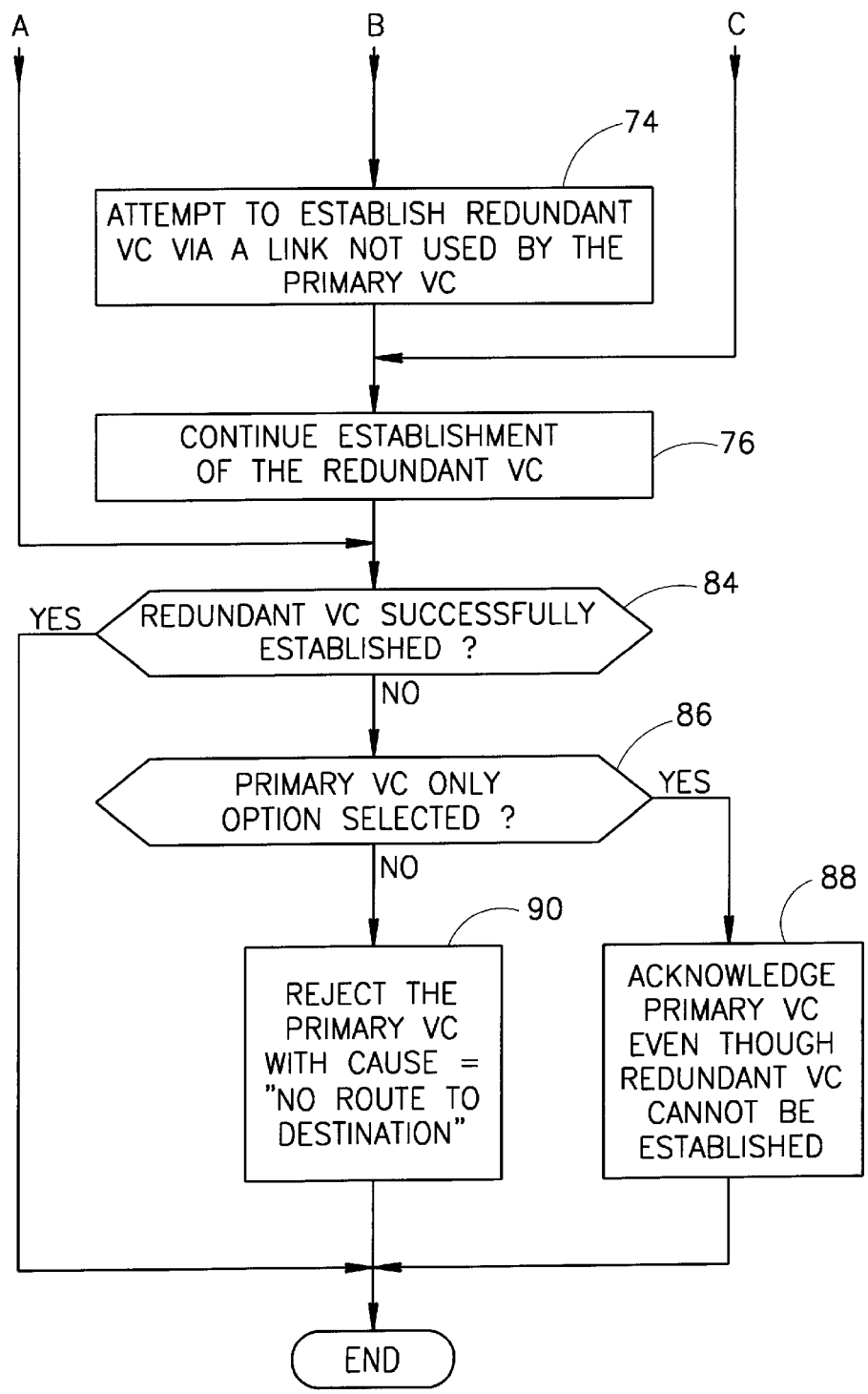

A flow diagram illustrating the VCC/VPC redundancy method of the present invention is shown in FIGS. 6A and 6B. The first step is to setup the primary virtual circuit (VC) utilizing the setup parameters shown in FIG. 3, i.e., calling party number with SEL equal to PRIMARY, CALL_REF and CALL_REF_REDUND (step 60). As described previously, the calling party number and the CALL_REF_REDUND are used by each node along the path to check for an overlap between the primary and redundant paths. Each network element along the path registers the primary call in its database (step 62). The call setup proceeds from switch to switch until the destination. If the primary path was established successfully, a CONNECT message is returned to the originator (either the end user or the network edge switch) (step 64).

Once the primary path is established successfully, the redundant path is setup next (step 66). The redundant virtual circuit (VC) is setup utilizing the setup parameters shown in FIG. 4, i.e., calling party number with SEL equal to REDUNDANT, CALL_REF and CALL_REF_REDUND. Each network element along the redundant path checks for an overlapping condition (step 68). Each network element searches its database for a primary call already registered utilizing both the calling party number and the CALL_REF_REDUND values. If none is found, the virtual circuit is established on the switch as part of the redundant path (step 80). The setup process then proceeds by sending a setup message to the next hop along the path (step 82).

If, however, a switch detects that a primary path already exists through that switch, then the switch acts in accordance with one of two options. If the option indicates (either configured previously or transmitted via the setup message) the Redundant Switch option (step 70), then the call is rejected via a RELEASE message with cause equal to "primary virtual circuit already exists" (step 72).

If the Redundant Link option is selected, the switch attempts to establish the redundant VC via a link that is not used by the primary VC (step 74). With either option, the establishment of the redundant path continues with the next hop (step 76). Note that a call rejection as in step 72 may trigger a CRANKBACK in one or more upstream nodes.

If the redundant virtual circuit is successfully established (step 84) then the redundant call is acknowledged to the user and the method terminates.

If, however, the redundant virtual circuit was not successfully established (step 84) then either one of two alternatives can be taken. If the Permit Primary VC Only option is selected, then the primary VC is acknowledged even though the redundant VC could not be established (step 88). Under the second option (Do Not Permit Primary VC Only option) the primary VC is rejected with a cause indicating "no route to destination" (step 90).

Figure 7:
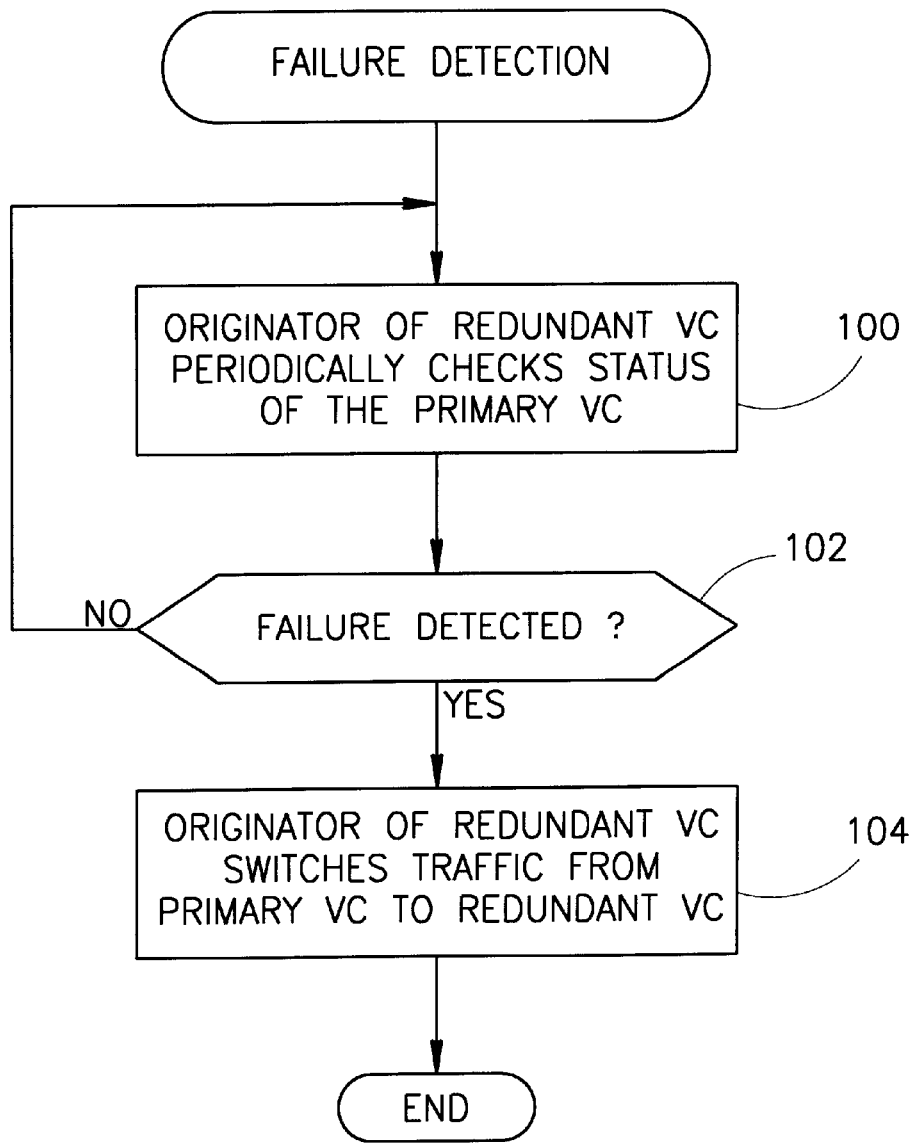
FIG. 7 is a flow diagram illustrating the failure detection method of the present invention.

A flow diagram illustrating the failure detection method of the present invention is shown in FIG. 7. Once the primary and redundant connections are established, the originator of the redundant VCC, i.e., the end user or the network edge switch, continuously checks the validity of the primary connection utilizing any suitable means (step 100). One alternative means is to use F5 end to end loopback Operations, Administration and Maintenance (OAM) cells to detect a failure on the primary path. The ATM standard includes various types of special cells (OAM cells) that carry OAM related information and are used in administrative and supervisory actions in connection with network performance monitoring and failure detection.

Upon not receiving the OAM F5 cells back, i.e., a failure is detected (step 102), the originator of the redundant VC switches the traffic onto the redundant VCC (step 104). It is important to node that both the originator and the destination of the call function to monitor the primary path for a failure. In addition, either the originator or the destination can detect the failure. In the event a failure is detected, the entity that detected the failure (1) immediately notifies the other end and (2) switches the data traffic from the primary to the redundant connection.

The switchover time is defined by the rate of transmission of the F5 cells, the round trip delay for the F5 cells, the time to detect the absence of the cells and the actual switching of the traffic from the primary to the redundant VCC. It is estimated that the total time for switchover should be in the range of a few milliseconds to at most a few tens of milliseconds. Alternatively, a hardware based mechanism can be utilized to handle the processing of the F5 cells in order to free the software from handling the F5 cell processing for each primary connection. Note that OAM F5 cells are carried over the same VPI/VCI as the underlying connection being monitored.

Any suitable method of switching from the primary to the redundant connection can be used with the present invention. A method suitable for use with the present invention is described in more detail in U.S patent application Ser. No. 08/697,220 filed Aug. 21, 1996, entitled A METHOD OF ROUTING IN AN ASYNCHRONOUS TRANSFER MODE NETWORK, now U.S. Patent No. 5,940,396, incorporated herein by reference in its entirety.

Figure 8:
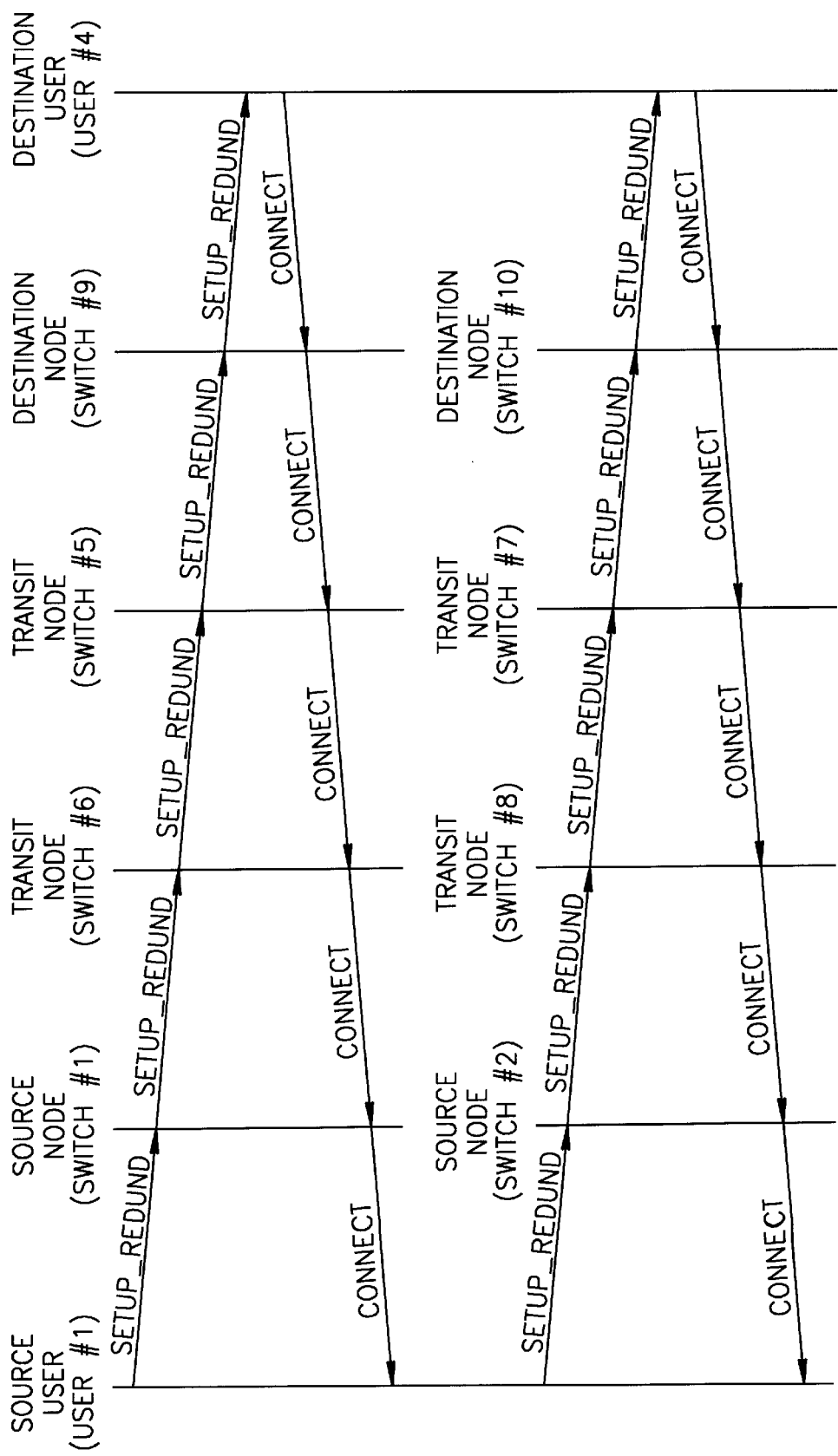
FIG. 8 is a diagram illustrating the message flow within the network between a source and destination user during the execution of the method of the present invention.

A diagram illustrating the message flow within the network between a source and destination user during the execution of the method of the present invention is shown in FIG. 8. The setup message SETUP_REDUND containing the IEs used in establishing the redundant connection is forwarded from switch to switch along the primary path. The example shown in FIG. 8 is for the case corresponding to the network illustrated in FIG. 1, i.e., user initiated mode whereby the user establishes both primary and redundant connections. The upper portion of FIG. 8 shows the message flow from the source end user #1 to the destination end user #4 which includes switches #1, #6, #5 and #9. The redundant path is established similarly from the source end user #1 to the destination end user #4 via switches #2, #8, #7 and #10. Once both paths are established, traffic proceeds while end user #1 continuously checks the validity of the primary connections.

While the invention has been described with respect to a limited number of embodiments, it will be appreciated that many variations, modifications and other applications of the invention may be made.

What is claimed is:

1. A method of providing virtual circuit connection/virtual path connection (VCC/VPC) redundancy on a selective basis in a network from a source end user to a destination end user, said method comprising the steps of:

establishing a primary virtual circuit (VC) connection from said source end user to said destination end user via a first route;

establishing a redundant virtual circuit (VC) connection from said source end user to said destination end user via a second route, wherein said second route is redundant to said first route;

monitoring said primary virtual circuit for a failure on a continual basis; and switching data traffic from said primary virtual circuit to said redundant virtual circuit in response to the detection of a failure on said primary virtual circuit.

2. The method according to claim 1, wherein network elements making up said first route are not part of said redundant route.

3. The method according to claim 1, wherein network elements making up said first route are mostly not part of said second route, and wherein said second route may include one or more overlapping network elements whereby any links into and out of said overlapping network element on said first route are not used on said second route.

4. The method according to claim 1, further comprising the step of rejecting the establishment of said primary virtual circuit and said redundant virtual circuit if said second route includes one or more overlapping network elements.

5. The method according to claim 1, firther comprising the step of permitting the establishment of said primary virtual circuit in the event that said redundant virtual circuit could not be established.

6. The method according to claim 1, wherein said step of monitoring comprises the step of utilizing Operations, Administration and Maintenance (OAM) F5 end to end cells to detect the failure of said primary virtual circuit.

7. The method according to claim 1, wherein a first virtual circuit is established between said source end user and a first network edge switch and a second virtual circuit is established between said destination end user and a second network edge switch.

8. The method according to claim 1, wherein said primary virtual circuit and said redundant virtual circuit are established between a first network edge switch and a second network edge switch, said source end user and said destination end user connected to said first and second edge switch, respectively, via a single virtual circuit.

9. The method according to claim 1, wherein said step of establishing a primary virtual circuit connection comprises the step of sending a setup message request containing a calling party number with a field indicating a primary route is to be established, standard call reference number and a redundant call reference number.

10. The method according to claim 1, wherein said step of establishing a redundant virtual circuit connection comprises the step of sending a setup message request containing a calling party number with a field indicating a redundant route is to be established, standard call reference number and a redundant call reference number.

11. The method according to claim 1, wherein said network comprises an Asynchronous transfer Mode (ATM) network.

12. The method according to claim 1, wherein said step of monitoring comprises both the originator and the destination of the call monitoring said primary virtual circuit for a failure on a continual basis.

* * * * *